United States Patent
Unohara et al.

(10) Patent No.: US 8,546,518 B2
(45) Date of Patent: Oct. 1, 2013

(54) POLYARYLENE SULFIDE AND METHOD FOR PRODUCING THE SAME

(75) Inventors: Takeshi Unohara, Nagoya (JP); Hiroyuki Isago, Nagoya (JP); Toru Nishimura, Nagoya (JP); Masahiro Inohara, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 13/391,952

(22) PCT Filed: Aug. 26, 2010

(86) PCT No.: PCT/JP2010/064439
§ 371 (c)(1),
(2), (4) Date: Mar. 23, 2012

(87) PCT Pub. No.: WO2011/024879
PCT Pub. Date: Mar. 3, 2011

(65) Prior Publication Data
US 2012/0178898 A1  Jul. 12, 2012

(30) Foreign Application Priority Data
Aug. 27, 2009  (JP) ................................ 2009-196453

(51) Int. Cl.
*C08G 75/16* (2006.01)
*C08G 75/14* (2006.01)
*C08G 75/00* (2006.01)

(52) U.S. Cl.
USPC ........... 528/381; 528/379; 528/383; 528/388; 528/397; 528/488; 528/489; 528/492; 528/502 R; 528/503

(58) Field of Classification Search
USPC .......... 528/381, 383, 388, 397, 488, 489, 528/492, 502 R, 503, 379
See application file for complete search history.

(56) References Cited

U.S. PATENT DOCUMENTS 5,744,576 A * 4/1998 Miyahara et al. ............. 528/388
7,115,704 B2 * 10/2006 Horiuchi et al. ............. 528/381

FOREIGN PATENT DOCUMENTS

| JP | 02-102228 | 4/1990 |
|---|---|---|
| JP | 8-183858 A | 7/1996 |
| JP | 08-198965 | 8/1996 |
| JP | 2000-246733 | 9/2000 |
| JP | 2001-172387 A | 6/2001 |
| JP | 2001-261832 A | 9/2001 |
| JP | 2002-265604 A | 9/2002 |
| JP | 2002-293934 A | 10/2002 |
| JP | 2005-54169 A | 3/2005 |
| JP | 2005-298669 A | 10/2005 |
| JP | 2006-037007 | 2/2006 |
| JP | 2007-308612 | 11/2007 |
| JP | 2008-231250 | 10/2008 |
| JP | 2009-144141 | 7/2009 |
| JP | 2010-53335 A | 3/2010 |

OTHER PUBLICATIONS

International Search Report dated Nov. 22, 2010, application No. PCT/JP2010/064439.
JPO Notification of Rejection dated Feb. 7, 2012, filing No. 2010-535155, with English Translation.

* cited by examiner

*Primary Examiner* — Duc Truong
(74) *Attorney, Agent, or Firm* — RatnerPrestia

(57) ABSTRACT

A method is provided for producing a polyarylene sulfide by reacting a sulfidizing agent with a dihalogenated aromatic compound in an organic polar solvent in the presence of an alkali metal hydroxide, the method includes <Step 1>: carrying out the reaction in such a manner that the polymerization time in a temperature range of 230° C. to less than 245° C. (T1a) is not less than 30 minutes and less than 3.5 hours and that the conversion ratio of the dihalogenated aromatic compound at the end of the step is 70 to 98 mol. % and <Step 2>: carrying out the reaction in such a manner that the polymerization time in a temperature range of 245° C. to less than 280° C. (T2) is not less than 5 minutes and less than 1 hour.

7 Claims, No Drawings

POLYARYLENE SULFIDE AND METHOD FOR PRODUCING THE SAME

CROSS REFERENCE TO RELATED APPLICATIONS

This application is the U.S. National Phase application of PCT International Application No. PCT/JP2010/064439, filed Aug. 26, 2010, and claims priority to Japanese Patent Application No. 2009-196453, filed Aug. 27, 2009, the disclosure of both are incorporated herein by reference in their entireties for all purposes.

FIELD OF THE INVENTION

The present invention relates to a polyarylene sulfide combining high melt flowability, a low volatile component content, and a high melt crystallization temperature, and to a method for efficiently producing the same.

BACKGROUND OF THE INVENTION

Polyarylene sulfide (hereinafter referred to as PAS for short), typified by polyphenylene sulfide (hereinafter referred to as PPS for short), has properties suitable for engineering plastics, such as excellent heat resistance, barrier properties, chemical resistance, electrical insulating properties, and moist-heat resistance, and has been used mainly in injection molding and extrusion molding applications and in various electrical and electronic parts, machine parts, automotive parts, films, fibers, and the like. Especially in recent years, downsizing and weight saving of molded articles have been accelerated for the purpose of environmental load reduction and cost reduction, whereby the shapes of molded articles have been increasingly complicated. Although a PAS having high melt flowability which can be applied to the complicated-shaped molded articles has been demanded, a PAS having high melt flowability tends to have an increased volatile component content during melting because it generally contains a large amount of low-molecular-weight components. Such a volatile component causes stains of a metal mold and vent clogging of a metal mold to thereby cause a problem of reduced production efficiency, therefore a PAS having both high melt flowability and a low volatile component content during melting has been strongly demanded. For further environmental load reduction and cost reduction, improved productivity by shortening a molding cycle has been demanded, and a PAS having a higher melt crystallization temperature has been desired. The present invention includes the discovery of a PAS combining the elements which have been strongly demanded for injection molding applications, that is, high melt flowability, a low volatile component content, and a high melt crystallization temperature, and a method for producing the same.

As a representative method for producing a PAS, the method in which a sulfidizing agent such as sodium sulfide is reacted with a dihalogenated aromatic compound such as p-dichlorobenzene in an organic polar solvent such as N-methyl-2-pyrrolidone (hereinafter referred to as NMP for short) is known. As a method for reducing the content of volatile components which generates when a PAS is melted, the method in which a PAS slurry resulting from the reaction is washed with an organic solvent such as acetone or NMP is commonly known. However, in this method, not only low-molecular-weight substances, a principal component of the volatile component, but also oligomers are removed by washing, and therefore the flowability when the PAS is melted tends to decrease. Therefore, investigations have been carried out to reduce the volatile component content while containing a certain amount of oligomers and maintaining high melt flowability. For example, Patent Document 1 discloses a method in which a polyhalogenated aromatic compound is reacted with a sulfidizing agent in a polar organic solvent; the reactant is recovered by the flash method; the resulting polymer is acid-treated at pH of 2 to 8 and 80 to 200° C.; and the resultant PPS is heat-treated under an atmosphere having an oxygen concentration of not less than 2% by volume at 160 to 270° C. for 0.2 to 50 hours. Generally, it is known that heat-treatment (cure) of a PPS under an oxygen atmosphere causes an increased melt viscosity due to oxidation crosslinking and decreased melt flowability, but in Patent Document 1, high melt flowability and a low volatile component content were achieved at the same time by controlling the heat treatment conditions at certain conditions. However, the peak temperature of crystallization of a PPS when cooled from a molten state under conditions of 20° C./min using differential scanning calorimetry (hereinafter referred to as DSC for short) was not more than 240° C., and a PPS having a high melt crystallization temperature suitable for injection molding was not obtained.

As a method for obtaining a PAS having a high melt crystallization temperature, acid-treating in washing after the reaction is known. For example, Patent Document 2 discloses a method in which sodium hydrosulfide is reacted with p-dichlorobenzene in the presence of NMP at 220° C. for 1.5 hours and further at 245° C. for 2 hours, and an acid treatment and an alkali treatment are combined under certain conditions in a post-treatment step of the resulting polymer. Although this method indeed provided a PAS having a high melt crystallization temperature, the PAS having a peak temperature of crystallization of not less than 248° C. when cooled from a molten state under conditions of 20° C./min using DSC was not obtained.

As an alternative method of increasing the melt crystallization temperature of PAS, Patent Document 3 discloses a method in which an alkali metal sulfide or an alkali metal sulfide-forming compound is reacted with a dihalogenated aromatic compound in an organic amide solvent at a temperature of 160 to 290° C.; the resulting reaction mixture is subjected to solid-liquid separation; the separated solid content is washed with an organic amide solvent; the separated solid content is further slurried with an organic amide solvent; and the slurry is reacted again at 160 to 290° C. for 10 minutes to 30 hours. Patent Document 4 discloses a method in which an alkali metal sulfide is reacted with a dihalogenated aromatic compound in an organic amide solvent at 260° C. for 2 hours; and 0.1 to 48 mol. % of oxygen per mol of an alkali metal sulfide charged is added to the resulting PAS slurry after completion of the reaction. Although these methods indeed provided a PAS having such a high melt crystallization temperature that a peak temperature of crystallization when cooled from a molten state under conditions of 10° C./min using DSC is not less than 250° C., both had a high melt viscosity and was not suitable for injection molding applications requiring high flowability.

Patent Document
  [Patent Document 1] JP 2009-144141 (claims, examples)
  [Patent Document 2] JP 8-198965 (claims, examples)
  [Patent Document 3] JP 2-102228 (claims, examples)
  [Patent Document 4] JP 2001-172387 (claims, examples)

SUMMARY OF THE INVENTION

The present invention has been achieved as a result of carrying out an investigation with the aim of efficiently obtaining a PAS combining high melt flowability, a low volatile component content, and a high melt crystallization temperature.

The present inventors discovered that a PAS combining high melt flowability, a low volatile component content, and a high melt crystallization temperature can be obtained, when reacting a sulfidizing agent with a dihalogenated aromatic compound in an organic polar solvent in the presence of an alkali metal hydroxide, by carrying out the reaction under certain temperature conditions for a certain time period, thereby accomplishing aspects of the present invention.

Thus, aspects of the present invention are as follows:

(1) A method for producing a polyarylene sulfide by reacting a sulfidizing agent with a dihalogenated aromatic compound in an organic polar solvent in the presence of an alkali metal hydroxide, wherein at least Steps 1 and 2 below are performed:

Step 1: In reacting the sulfidizing agent with the dihalogenated aromatic compound in the organic polar solvent in the presence of the alkali metal hydroxide, carrying out the reaction in a temperature range of 230° C. to less than 245° C. such that a polymerization time (T1a) including a time of rising and falling temperature is not less than 30 minutes and less than 3.5 hours and that a conversion ratio of the dihalogenated aromatic compound at the end of the step is 70 to 98 mol. % to produce a prepolymer of polyarylene sulfide, and Step 2: Carrying out the reaction in a temperature range of 245° C. to less than 280° C. for a polymerization time (T2) including a time of rising and falling temperature of 5 minutes to less than 1 hour to obtain a polyarylene sulfide.

(2) The method for producing a polyarylene sulfide according to (1), wherein a ratio of the polymerization time of 230° C. to less than 245° C. in the Step 1 (T1a) to the polymerization time in the Step 2 (T2)(T1a/T2) is 0.5 or more.

(3) The method for producing a polyarylene sulfide according to (1) or (2), wherein the polymerization time (T1) including a time of rising and falling temperature in a temperature range of 200° C. to less than 245° C., which includes Step 1, is not less than 1.5 hours and less than 4 hours.

(4) The method for producing a polyarylene sulfide according to any one of (1) to (3), wherein a ratio of the polymerization time of 200° C. to less than 245° C. (T1) to the polymerization time in the Step 2 (T2)(T1/T2) is 1.2 or more.

(5) The method for producing a polyarylene sulfide according to any one of (1) to (4), wherein the polyarylene sulfide is recovered by the flash method.

(6) The method for producing a polyarylene sulfide according to any one of (1) to (5), wherein the amount of the alkali metal hydroxide present in the reaction system at the start of the Step 1 is from 0.9 mol to less than 1.2 mol per mol of the sulfidizing agent.

(7) The method for producing a polyarylene sulfide according to any one of (1) to (6), wherein the amount of the organic polar solvent used in the reaction is from 2.5 mol to less than 5.5 mol per mol of the sulfidizing agent.

(8) A polyarylene sulfide which is characterized in that the content of volatile components which volatilizes when the polyarylene sulfide is melted by heat under vacuum at 320° C. for 2 hours is not more than 1.0% by weight; a melt viscosity (measured at a temperature of 300° C. and a shear rate of 1216 sec$^{-1}$) is from 2 Pa·s to less than 100 Pa·s; and a melt crystallization peak temperature detected using differential scanning calorimetry when temperature is raised to 340° C. and lowered at a rate of 20° C./min after holding for 1 minute is not less than 248° C.

(9) The polyarylene sulfide according to (8), wherein a chloroform extracted volume is not less than 1.0% by weight.

According to an aspect of the present invention, a PAS combining high melt flowability, a low volatile component content, and a high melt crystallization temperature can be efficiently obtained.

DETAILED DESCRIPTION OF THE INVENTION

The PAS is a homopolymer or copolymer having a repeating unit of formula: —(Ar—S)— as a main constituent unit and preferably containing the repeating unit in an amount of 80 mol. % or more. Examples of Ar include units represented by, e.g., Formula (A) to Formula (J) below, among which Formula (A) is particularly preferred.

(A)

(B)

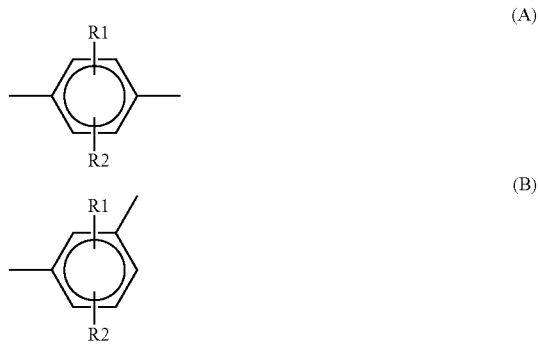

(C)

(D)

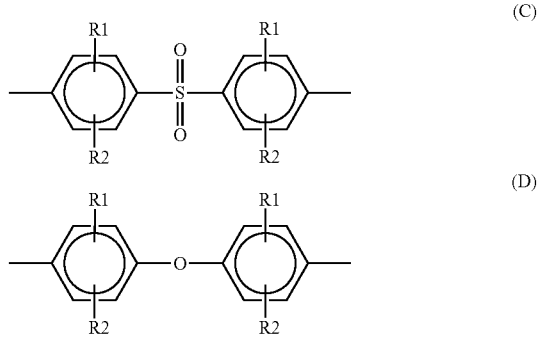

(E)

(F)

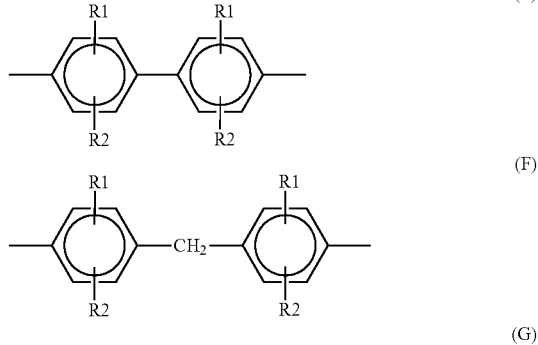

(G)

(H)

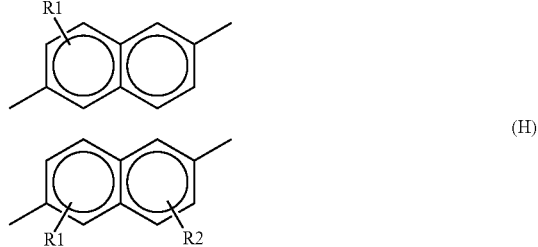

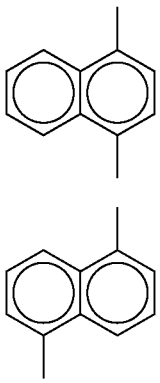

(R1 and R2 are a substituent selected from hydrogen, alkyl group, alkoxy group, and halogen group, and R1 and R2 may be the same or different)

As long as these repeating units are a main constituent unit, a small amount of branch units or cross-linking units represented by, e.g., Formula (K) to Formula (M) below may be contained. The amount of copolymerization of such branch units or cross-linking units is preferably in the range of 0 to 1 mol. % per mol of the unit: —(Ar—S)—.

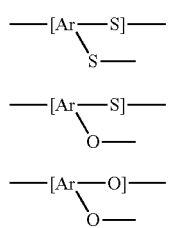

The PAS may be any of a random copolymer, a block copolymer, and mixtures thereof containing the above-described repeating unit.

Representative of these include polyphenylene sulfide, polyphenylene sulfide sulfone, polyphenylene sulfide ether, and a random copolymer or a block copolymer thereof and mixtures thereof. Particularly preferred examples of PAS include polyphenylene sulfide, polyphenylene sulfide sulfone, and polyphenylene sulfide ether containing as a main constituent unit of the polymer a p-phenylene sulfide unit:

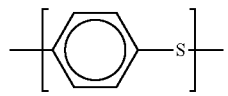

in an amount of 80 mol. % or more, especially 90 mol. % or more, and polyphenylene sulfide is particularly preferred.

With respect to the method for producing the PAS, sulfidizing agent, organic polar solvent, dihalogenated aromatic compound, polymerization modifier compound, branch-crosslinking agent, molecular weight modifier, polymerization stabilizer, pre-step, polymerization process, polymer recovery, produced PAS, other post-treatment, and applications will now be described in detail in the order mentioned.

(1) Sulfidizing Agent

Examples of sulfidizing agents used in the present invention include alkali metal sulfides, alkali metal hydrosulfides, and hydrogen sulfide.

Specific examples of alkali metal sulfides include, for example, lithium sulfide, sodium sulfide, potassium sulfide, rubidium sulfide, cesium sulfide, and mixtures of two or more of them, among which sodium sulfide is preferably used. These alkali metal sulfides can be used as a hydrate or an aqueous mixture, or in the form of an anhydride.

Specific examples of alkali metal hydrosulfides include, for example, sodium hydrosulfide, potassium hydrosulfide, lithium hydrosulfide, rubidium hydrosulfide, cesium hydrosulfide, and mixtures of two or more of them, among which sodium hydrosulfide is preferably used. These alkali metal hydrosulfides can be used as a hydrate or an aqueous mixture, or in the form of an anhydride.

A sulfidizing agent prepared from an alkali metal hydrosulfide and an alkali metal hydroxide in situ in a reaction system can also be used. Further, a sulfidizing agent prepared from an alkali metal hydrosulfide and an alkali metal hydroxide can be transferred to a polymerization tank for use.

Alternatively, a sulfidizing agent prepared from an alkali metal hydroxide such as lithium hydroxide or sodium hydroxide and hydrogen sulfide in situ in a reaction system can also be used. Further, a sulfidizing agent prepared from an alkali metal hydroxide such as lithium hydroxide or sodium hydroxide and hydrogen sulfide can be transferred to a polymerization tank for use.

In one aspect of the present invention, the amount of a sulfidizing agent, in cases where a portion of the sulfidizing agent is lost by, e.g., dehydration operation before the start of polymerization reaction, shall mean a residual amount obtained by subtracting the loss from the actual amount charged.

Together with a sulfidizing agent, an alkali metal hydroxide and/or an alkaline earth metal hydroxide can also be used in combination. Specific examples of preferred alkali metal hydroxides include, for example, sodium hydroxide, potassium hydroxide, lithium hydroxide, rubidium hydroxide, cesium hydroxide, and mixtures of two or more of them, and specific examples of alkaline earth metal hydroxides include, for example, magnesium hydroxide, calcium hydroxide, strontium hydroxide, and barium hydroxide, among which sodium hydroxide is preferably used.

In the case where an alkali metal hydrosulfide is used as a sulfidizing agent, it is especially preferable to use an alkali metal hydroxide simultaneously, and the amount used is, for example, in the range of 0.9 mol to less than 1.2 mol, preferably 0.95 mol to less than 1.15 mol, and more preferably 0.95 mol to less than 1.1 mol, per mol of the alkali metal hydrosulfide. Within these ranges, a PAS with reduced polymerization byproducts can be obtained without causing degradation.

(2) Organic Polar Solvent

In an embodiment of the present invention, an organic polar solvent is used as a polymerization solvent. Specifically, N-alkyl pyrrolidones such as N-methyl-2-pyrrolidone and N-ethyl-2-pyrrolidone; caprolactams such as N-methyl-ε-caprolactam; aprotic organic solvents typified by 1,3-dimethyl-2-imidazolidinone, N,N-dimethylacetamide, N,N-dimethylformamide, hexamethylphosphoric triamide, dimethyl sulfone, and tetramethylene sulfoxide; and mixtures thereof are preferably used because of their high reaction stability. Among them, N-methyl-2-pyrrolidone (NMP) is particularly preferably used.

Although the amount of an organic polar solvent used as a polymerization solvent for PAS is not particularly restricted, from the standpoint of stable reactivity and economy, the range of 2.5 mol to less than 5.5 mol, preferably 2.5 mol to less than 5 mol, and more preferably 2.5 mol to less than 4.5 mol, per mol of a sulfidizing agent, is selected.

(3) Dihalogenated Aromatic Compound

Examples of dihalogenated aromatic compounds used in the present invention include dihalogenated benzenes such as p-dichlorobenzene, m-dichlorobenzene, o-dichlorobenzene, and p-dibromobenzene; and dihalogenated aromatic compounds also containing a substituent(s) other than halogen, such as 1-methoxy-2,5-dichlorobenzene and 3,5-dichlorobenzoic acid. Among them, dihalogenated aromatic compounds having a p-dihalogenated benzene typified by p-dichlorobenzene as a principal component are preferred. Two or more different dihalogenated aromatic compounds can also be used in combination to produce a PAS copolymer.

The amount of a dihalogenated aromatic compound used is, for example, in the range of 0.8 mol to less than 1.5 mol, preferably 0.9 mol to less than 1.1 mol, more preferably 0.95 mol to less than 1.08 mol, and further preferably 0.95 mol to less than 1.05 mol, per mol of a sulfidizing agent, from the standpoint of reducing the degradation as well as efficiently obtaining a PAS having a viscosity suitable for processing.

(4) Polymerization Modifier Compound

In the present invention, using a polymerization modifier compound is also one of the preferred embodiments. One of the purposes of using a polymerization modifier compound is an adjustment of the melt viscosity of a PAS to a desired one, and the other purpose is a reduction of the volatile component content. Specific examples of such polymerization modifier compounds include, for example, organic metal carboxylates, water, alkali metal chlorides, organic metal sulfonates, alkali metal sulfates, alkaline earth metal oxides, alkali metal phosphates, and alkaline earth metal phosphates. These may be used alone, or two or more of them may be used simultaneously. Among them, an organic metal carboxylate and/or water are/is preferably used.

Preferred examples of organic metal carboxylates include a compound represented by the formula R(COOM)n (wherein, R represents an alkyl group, cycloalkyl group, aryl group, alkylaryl group, or arylalkyl group having 1 to 20 carbon atoms: M represents an alkali metal selected from lithium, sodium, potassium, rubidium, and cesium: and n represents an integer of 1 to 3.). An organic metal carboxylate can be used also as a hydrate, an anhydride, or an aqueous solution. Specific examples of organic metal carboxylates include, for example, lithium acetate, sodium acetate, potassium acetate, sodium propionate, lithium valerate, sodium benzoate, sodium phenylacetate, potassium p-toluoylate, and mixtures thereof. An organic metal carboxylate can be formed by adding approximately equal chemical equivalents of an organic acid and at least one compound selected from the group consisting of alkali metal hydroxides, alkali metal carbonates, and alkali metal bicarbonates for reaction. Among the organic metal carboxylates described above, presumably, lithium salts have high solubility in the reaction system and a great modifying effect but are expensive; and potassium, rubidium, and cesium salts have poor solubility in the reaction system, so that sodium acetate, which is inexpensive and have moderate solubility in the reaction system, is preferably used.

The amount of the above-described organic metal carboxylate when used as a polymerization modifier compound is preferably in the range of 0.01 mol to less than 0.7 mol, more preferably in the range of 0.02 mol to less than 0.6 mol, and further preferably in the range of 0.02 mol to less than 0.55 mol, per mol of a sulfidizing agent charged.

In the case where an organic metal carboxylate is used as a polymerization modifier compound, the time of addition is not particularly restricted, and it may be added at any time, e.g., during the pre-step described below, at the start of polymerization, or during polymerization, or may be dividedly added in several times. In terms of ease of addition, it is preferably added simultaneously at the start of the pre-step or at the start of polymerization.

In the case where water is used as a polymerization modifier compound, water can be used alone, but it is preferable to use an organic metal carboxylate simultaneously, whereby there is a tendency that the effect as a polymerization modifier compound can be further enhanced and that a PAS having a desired melt viscosity can be obtained in a short time even when the amount of a polymerization modifier compound used is smaller. In this case, a preferred range of the amount of water in the polymerization system is 0.8 mol to less than 3 mol per mol of a sulfidizing agent, and more preferably it is 0.85 mol to less than 1.8 mol. When the amount of water is too large, the increase in the pressure in the reactor is large, and a reactor having high pressure resistance is needed, which is likely to be undesirable in terms of both economy and safety. Preferably, the conversion ratio of the dihalogenated aromatic compound at a stage when the amount of water in the polymerization system is in the above-described range is, as described below, not less than 60 mol. %, preferably not less than 70%, more preferably not less than 80%, and further preferably not less than 90%.

Adding water after polymerization is also one of the preferred embodiments. A preferred range of the amount of water in the polymerization system after adding water after polymerization is 1 to 15 mol per mol of a sulfidizing agent, more preferably 1.5 to 10 mol.

(5) Branch-Crosslinking Agent, Molecular Weight Modifier

In one embodiment of the present invention, to form a branch or crosslinking polymer, branch-crosslinking agents such as a polyhalogenated (tri- or higher halogenated) compound (which need not necessarily be an aromatic compound), an active hydrogen-containing halogenated aromatic compound, and a halogenated aromatic nitro compound can be used in combination. As a polyhalogenated compound, commonly-used compounds can be used, and above all, a polyhalogenated aromatic compound is preferred. Specific examples include 1,3,5-trichlorobenzene, 1,2,4-trichlorobenzene, 1,2,4,5-tetrachlorobenzene, hexachlorobenzene, and 1,4,6-trichloronaphthalene, among which 1,3,5-trichlorobenzene and 1,2,4-trichlorobenzene are preferred. Examples of the active hydrogen-containing halogenated aromatic compounds described above include, for example, a halogenated aromatic compound having a functional group such as amino group, mercapto group, and hydroxyl group. Specific examples include, for example, 2,5-dichloroaniline, 2,4-dichloroaniline, 2,3-dichloroaniline, 2,4,6-trichloroaniline, 2,2'-diamino-4,4'-dichlorodiphenyl ether, and 2,4'-diamino-2',4-dichlorodiphenyl ether. Examples of the halogenated aromatic nitro compounds described above include, for example, 2,4-dinitrochlorobenzene, 2,5-dichloronitrobenzene, 2-nitro-4,4'-dichlorodiphenyl ether, 3,3'-dinitro-4,4'-dichlorodiphenyl sulfone, 2,5-dichloro-2-nitropyridine, and 2-chloro-3,5-dinitropyridine.

For the purpose of adjusting the molecular weight of a PAS, monohalogenated compounds (which need not necessarily be an aromatic compound) can also be used in combination. Examples of monohalogenated compounds include monohalogenated benzenes, monohalogenated naphthalenes, monohalogenated anthracenes, monohalogenated compounds containing two or more benzene rings, and monohalogenated heterocyclic compounds. Among them, monohalogenated benzenes are preferred from the standpoint of economy. Further, two or more different monohalogenated compounds can be used in combination.

(6) Polymerization Stabilizer

In the production of the PAS, polymerization stabilizers can also be used to stabilize the polymerization reaction system and prevent side reactions. Polymerization stabilizers contribute to the stabilization of the polymerization reaction system and inhibit undesirable side reactions. One indicator of the side reactions is production of thiophenol, and the addition of polymerization stabilizers can inhibit the production of thiophenol. Specific examples of polymerization stabilizers include, compounds such as alkali metal hydroxides, alkali metal carbonates, alkaline earth metal hydroxides, and alkaline earth metal carbonates. Among them, alkali metal hydroxides such as sodium hydroxide, potassium hydroxide, and lithium hydroxide are preferred. The above-mentioned organic metal carboxylates are also one of the polymerization stabilizer used, because they act as a polymerization stabilizer. As mentioned above, in the case where an alkali metal hydrosulfide is used as a sulfidizing agent, it is especially preferable to use an alkali metal hydroxide simultaneously, and the alkali metal hydroxide being excessive relative to the sulfidizing agent can be a polymerization stabilizer.

Such polymerization stabilizers may be used individually, or two or more of them may be used in combination. Desirably, polymerization stabilizers are used at a rate of generally 0.01 to 0.2 mol, preferably 0.03 to 0.1 mol, per mol of a sulfidizing agent in the reaction system before the start of the polymerization reaction. When the rate is too high, it tends to be economically disadvantageous or lead to a decreased polymer yield. When part of the alkali metal sulfide decomposes during the reaction to generate hydrogen sulfide, the resulting alkali metal hydroxide can also be a polymerization stabilizer.

The time of adding polymerization stabilizers is not particularly specified, and it may be added at any time, e.g., during the pre-step described below, at the start of polymerization, or during polymerization, or may be dividedly added in several times.

(7) Pre-Step

In the method for producing the PAS, a sulfidizing agent is used generally in the form of a hydrate, and it is preferable to remove an excessive amount of water from the system by warming the mixture containing an organic polar solvent and a sulfidizing agent, prior to the addition of a dihalogenated aromatic compound. When water is removed excessively by this operation, it is preferable to add water to replenish the shortage.

As mentioned above, as a sulfidizing agent, an alkali metal sulfide prepared from an alkali metal hydrosulfide and an alkali metal hydroxide in situ in a reaction system or in a tank other than the polymerization tank can also be used. The method is not particularly restricted, and examples thereof include a method in which an alkali metal hydrosulfide and an alkali metal hydroxide is added to an organic polar solvent desirably under an inert gas atmosphere in a temperature range from normal temperature to 150° C., preferably from normal temperature to 100° C.; and the temperature is raised to at least 150° C. or higher, preferably to 180° C. to 260° C. under atmospheric pressure or reduced pressure to evaporate water. At this point, a polymerization modifier compound may be added. Further, to promote the evaporation of water, toluene or the like may be added for the reaction.

The amount of water in the system when the pre-step is completed is preferably 0.9 to 1.1 mol per mol of a sulfidizing agent charged. The amount of water in the system herein refers to the amount obtained by subtracting the amount of water removed from the system from the amount of water charged in the pre-step. The water charged may be in any form such as water, an aqueous solution, or water of crystallization.

After completion of the pre-step, the polymerization reaction is carried out by contacting the reactant prepared in the pre-step with a dihalogenated aromatic compound in an organic polar solvent. The polymerization reaction process described below may be carried out in the same reactor as in the pre-step, or the polymerization reaction process may be carried out after transferring the reactant prepared in the pre-step to a reaction vessel different from that in the pre-step.

(8) Polymerization Process

To obtain the PAS combining high melt flowability, a low volatile component content, and a high melt crystallization temperature, it is necessary to go through a certain polymerization process. Such a polymerization process means the following steps in obtaining PAS by reacting a sulfidizing agent with a dihalogenated aromatic compound in an organic polar solvent in the presence of an alkali metal hydroxide:

<Step 1> Carrying out the reaction in a temperature range of 230° C. to less than 245° C. such that a polymerization time (T1a) including a time of rising and falling temperature is not less than 30 minutes and less than 3.5 hours and that a conversion ratio of the dihalogenated aromatic compound at the end of the step is 70 to 98 mol. % to produce a prepolymer of PAS, and <Step 2> Carrying out the reaction in a temperature range of 245° C. to less than 280° C. for a polymerization time (T2) including a time of rising and falling temperature of 5 minutes to less than 1 hour to obtain a PAS. By going through the steps, the PAS can be obtained efficiently in a short time.

Step 1 and Step 2 will now be described in detail.

<Step 1> In one aspect of the present invention, when polymerizing a sulfidizing agent and a dihalogenated aromatic compound in an organic polar solvent in the presence of an alkali metal hydroxide, a polymerization time (T1a) including a time of rising and falling temperature in a temperature range of 230° C. to less than 245° C. needs to be not less than 30 minutes and less than 3.5 hours. To obtain the PAS having a low volatile component content during melting, Step 2 is preferably carried out after sufficiently increasing the conversion ratio of the dihalogenated aromatic compound at a low temperature. However, since the reaction rate is slow in the reaction at a polymerization temperature of less than 230° C., the conversion ratio of the dihalogenated aromatic compound can hardly be increased. Consequently, the melt viscosity of the PAS obtained through Step 2 is too low, and it is likely that the melt flowability suitable for injection molding cannot be obtained. Further, a long-time reaction is required for increasing the conversion ratio of the dihalogenated aromatic compound by the reaction only at less than 230° C., which is undesirable in terms of production efficiency. Therefore, it is recommended that the reaction should be carried out in a temperature range of 230° C. to less than 245° C., in which range the reaction rate is relatively high, for not less than 30 minutes and less than 3.5 hours, preferably not less than 40 minutes and less than 3.5 hours, more preferably not less than 1 hour and less than 3 hours, and further preferably not less than 1.5 hours and less than 3 hours. The conversion ratio of the dihalogenated aromatic compound is increased in a temperature range of 230° C. to less than 245° C., in which range the reaction rate is relatively high, it is preferred that the polymerization time in a temperature range less than 230° C. be short in terms of production efficiency, and, for example, the polymerization time in a temperature range of 200° C. to less than 230° C. is preferably within 2 hours, more preferably within 1 hour. Further, the polymerization time (T1) including a time of rising and falling temperature in a temperature range of 200° C. to less than 245° C., which includes Step 1, is preferably not less than 1.5 hours and less than 4 hours, more preferably not less than 1.5 hours and less than 3.5 hours, and further preferably not less than 2 hours and not more than 3.5 hours. When T1 is less than 1.5 hours, the conversion ratio of the dihalogenated aromatic compound described below is too low. Therefore, the unreacted sulfidizing agent causes decomposition of the prepolymer in Step 2, and the volatile component when the PAS obtained is melted by heat tends to increase. T1 over 4 hours leads to decreased production efficiency.

The average rate of temperature rise in such a polymerization temperature range is desirably 0.1° C./min or more. The average rate of temperature rise refers to the average rate calculated from the time, m (min), required for raising the temperature over the temperature zone from a certain temperature, t2 (° C.), to a certain temperature, t1 (° C.), (wherein t2<t1) using the following equation:

Average rate of temperature rise (° C./min)=
[$t1$ (° C.)–$t2$ (° C.)]/m(min)

Therefore, the rate need not necessarily be constant as long as it is within the range of the average rate of temperature rise mentioned above. There may be a constant temperature zone, and the temperature may be raised in a multi-stage manner. There may be a zone in which the rate of temperature rise is temporarily negative as long as the essence of the present invention is not impaired.

The average rate of temperature rise described above is preferably not more than 2.0° C./min, more preferably not more than 1.5° C./min. When the average rate of temperature rise is too high, it can be difficult to control the reaction, and larger energy tends to be required for raising the temperature. When a vigorous reaction occurs at an early stage of the reaction, it tends to be preferred that the reaction be carried out in such a manner that the temperature is raised to a temperature above 240° C. after carrying out the reaction to some extent at not more than 240° C.

In one aspect of the present invention, it is necessary to produce a prepolymer of the PAS by carrying out the reaction such that the conversion ratio of the dihalogenated aromatic compound at the end of Step 1 is 70 to 98 mol. %, and it is desirable to carry out the reaction such that the conversion ratio is preferably 75 mol. % or more, more preferably 80 mol. % or more, and further preferably 90 mol. % or more. If the process proceeds to Step 2 with the conversion ratio being low, the unreacted sulfidizing agent causes decomposition of the prepolymer. Consequently, the volatile component content when the PAS obtained is melted by heat tends to increase, and besides the melt crystallization temperature tends to be low. If the reaction is carried out until the conversion ratio in Step 1 exceeds 98 mol. %, a long polymerization time is required, which leads to decreased production efficiency, and in addition the PAS having high melt flowability cannot be obtained. The conversion ratio of the dihalogenated aromatic compound (hereinafter referred to as DHA for short) is a value calculated by the equation below. Generally, the residual amount of DHA can be determined by the gas chromatography method.

(a) In the case where a dihalogenated aromatic compound is added excessively in a molar ratio relative to a sulfidizing agent:

Conversion ratio=[[amount of DHA charged (mol)–residual amount of DHA (mol)]/[amount of DHA charged (mol)–excessive amount of DHA (mol)]]×100%

(b) In the other cases than the above (a)

Conversion ratio=[[amount of DHA charged (mol)–residual amount of DHA (mol)]/[amount of DHA charged (mol)]]×100%.

<Step 2> In another aspect of the present invention, when polymerizing a sulfidizing agent and a dihalogenated aromatic compound in an organic polar solvent in the presence of an alkali metal hydroxide, it is necessary to perform, following Step 1, the step of carrying out the reaction in a temperature range of 245° C. to less than 280° C. for a polymerization time (T2) including a time of rising and falling temperature of 5 minutes to less than 1 hour to obtain a PAS. The final temperature in Step 2 is preferably less than 275° C., more preferably less than 270° C. If the polymerization is terminated only with Step 1 without going through Step 2, or if the polymerization time in Step 2 is extremely short, the melt viscosity of the PAS is too low, and the strength of molded articles tends to decrease, whereby a PAS having melt flowability suitable for injection molding cannot be obtained. In the case where the flash method is used in the polymer recovery step described below, if the temperature of a polymer is low, the flash energy is lowered, and a problem arises in that the heat of vaporization of a polymerization solvent is reduced, whereby the flash recovery cannot be accomplished efficiently. In addition, if the final temperature in Step 2 reaches 280° C. or higher, there is a tendency that the melt viscosity of the PAS becomes too high and also that the increase in the pressure in the reactor becomes large, and a reactor having higher pressure resistance may be needed, which is undesirable in terms of both economy and safety.

The polymerization time in Step 2 (T2) is advantageously not less than 5 minutes and less than 1 hour, and is preferably not less than 10 minutes and less than 55 minutes, more preferably not less than 10 minutes and less than 50 minutes. When a sulfidizing agent is reacted with a dihalogenated aromatic compound in an organic polar solvent in the presence of an alkali metal hydroxide, an alkali metal alkylaminoalkylcarboxylate produced by reacting the organic polar solvent such as NMP with the alkali metal hydroxide makes a contribution as a side reaction during polymerization reaction, but if the polymerization time in Step 2 (T2) is not less than 1 hour, there is a tendency that the proceeding of the side reaction is so significant that the volatile component content derived from the side-reaction product increases when the PAS obtained is melted by heat. Further, a long polymerization time causes a problem of decreased production efficiency and increased melt viscosity of the PAS.

The reaction in Step 2 may be any of a single step reaction carried out at a constant temperature, a multistep reaction in which the temperature is raised stepwise, and a reaction in which the temperature is changed continuously.

To obtain the PAS combining high melt flowability, a low volatile component content, and a high melt crystallization temperature, the ratio of the polymerization time in Step 1 (T1a) to the polymerization time in Step 2 (T2) (T1a/T2) is preferably 0.5 or more. The higher the ratio, the more the conversion ratio of the dihalogenated aromatic compound can be increased by adequately ensuring the polymerization time in Step 1, and at the same time the more the high melt flowability and the low volatile component content can be ensured by shortening the polymerization time in Step 2. Therefore, T1a/T2 is more preferably 0.7 or more, further preferably 1 or more, and especially preferably 2 or more.

Although the upper limit of T1a/T2 is not particularly restricted, in order to obtain a PAS having preferred melt flowability, it is preferably not more than 25, more preferably not more than 20.

The ratio of the polymerization time (T1) in a temperature range of 200° C. to less than 245° C., which includes Step 1, to the polymerization time in Step 2 (T2) (T1/T2) is preferably 1.2 or more. The higher the ratio, the more the conversion ratio of the dihalogenated aromatic compound can be increased by adequately ensuring the polymerization time at a low temperature, and at the same time the more the high melt flowability and the low volatile component content can be ensured by shortening the polymerization time in Step 2. Therefore, T1/T2 is more preferably 3 or more, further preferably 5 or more. Although the upper limit of T1/T2 is not particularly restricted, in order to obtain a PAS having preferred melt flowability, it is preferably not more than 30, more preferably not more than 25.

Further, to obtain the PAS, the total reaction time from the start of Step 1 to the end of Step 2 (T1+T2) is preferably less than 5 hours, more preferably less than 4 hours, and further preferably less than 3.5 hours. Longer polymerization time tends to lead to decreased production efficiency and also cause an increased volatile component content during melting and decreased melt flowability.

In the polymerization, various known modes of polymerization such as the batch mode and the continuous mode can be employed. The atmosphere during the polymerization is desirably a non-oxidizing atmosphere, and the polymerization is preferably carried out under an inert gas atmosphere such as nitrogen, helium, or argon, especially preferably nitrogen from the standpoint of economy and ease of handling. The reaction pressure is not particularly restricted because it depends on, for example, the type and amount of the materials and solvents used or the reaction temperature and cannot be equally defined.

To further reduce the volatile component content of the PAS, it is preferable to carry out at least a part of all the polymerization processes in the presence of the polymerization modifier compound mentioned above. Although the time of addition of the polymerization modifier compound is not particularly restricted, and it may be added at any time, e.g., before the start of the pre-step, at the start of Step 1, during Step 1, at the start of Step 2, and during Step 2, or may be dividedly added in several times, the volatile component content of the PAS can be further reduced when at least Step 2 is carried out in the presence of the polymerization modifier compound. Although the polymerization modifier compound may be added in any form such as an anhydride, a hydrate, an aqueous solution, or a mixture with an organic polar solvent, in the case where the polymerization modifier compound to be added contains water and where it is added at the start of Step 2 or during Step 2, the amount of water in the reaction system at the time when the addition of the polymerization modifier compound is complete is 0.8 mol to 3 mol, more preferably 0.85 to 1.8 mol, per mol of a sulfidizing agent.

(9) Polymer Recovery

In the production of the PAS, after completion of the polymerization process, the PAS is recovered from the polymerization reaction product containing, e.g., PAS components and a solvent obtained in the polymerization process. Examples of recovery methods include, for example, the flash method, that is, the method in which a polymerization reaction product is flashed from a high-temperature and high-pressure state (generally at 245° C. or higher and 0.8 MPa or higher) into an atmospheric or reduced pressure atmosphere to recover the powdered polymer simultaneously with solvent recovery; and the quench method, that is, the method in which a polymerization reaction product is gradually cooled from a high-temperature and high-pressure state to precipitate PAS components in the reaction system, and the precipitate is filtered at 70° C. or higher, preferably 100° C. or higher to recover a PAS component-containing solid in the form of granules.

Although the method is not limited to either of the quench method or the flash method as long as the PAS combining high melt flowability, a low volatile component content, and a high melt crystallization temperature can be obtained, the flash method is a preferred recovery method because it is an economically superior recovery method in that, e.g., the solid can be recovered simultaneously with solvent recovery; the recovery time is relatively short; and the amount of the recovery obtained is larger than in the quench method, and because the PAS obtained by the flash method contains a large amount of oligomer components typified by chloroform extract, whereby a PAS having high melt flowability compared to the PAS obtained by the quench method is easily obtained. The chloroform extracted volume suitable for providing high melt flowability is, for example, 1.0% by weight or more, more preferably 2.0% by weight or more.

Examples of preferred embodiments of the flash method include a method in which the high-temperature and high-pressure polymerization reaction product obtained in the polymerization process is jetted through a nozzle into an atmosphere such as nitrogen or water vapor in an atmospheric pressure. In the flash method, a solvent can be efficiently recovered by utilizing the heat of vaporization of the solvent generated when a polymerization reaction product is flashed from a high-temperature and high-pressure state to an atmospheric pressure state. However, in cases where the inner temperature during flashing is low, the efficiency in solvent recovery decreases, and the productivity deteriorates. Therefore, the temperature in the polymerization system during flashing, that is, the temperature of a polymerization reaction product is preferably 250° C. or higher, more preferably 255° C. or higher. As the temperature of the atmosphere such as nitrogen or water vapor during flashing into an atmospheric pressure, the temperature of 150 to 250° C. is generally selected, and when the solvent recovery from the polymerization reaction product is insufficient, the heating may be continued under an atmosphere such as nitrogen or water vapor at 150 to 250° C. after the flashing.

The PAS obtained by the flash method is generally subjected to washing because it contains ionic impurities such as alkali metal halides and alkali metal organic compounds, which are polymerization byproducts. Washing conditions are not restricted as long as they are conditions sufficient to remove such ionic impurities. Examples of washing methods include a method using, for example, water or an organic solvent as a washing solution, and washing with water can be exemplified as a preferred method because the PAS can be obtained conveniently and inexpensively. Preferred examples of water used include ion exchanged water and distilled water.

The washing temperature during washing the PAS is preferably 50° C. to 200° C., more preferably 150° C. to 200° C., and further preferably 180° C. to 200° C. The operation of a treatment with a liquid of 100° C. or more is generally performed by introducing a predetermined amount of PAS into a predetermined amount of the liquid and heating and stirring the resulting solution at an atmospheric pressure or in a pressure vessel. Washing may be carried out for several times, and the washing temperatures may be different for each washing. However, to obtain a PAS having a small amount of ionic impurities, washing is preferably carried out at a temperature of 150° C. or higher at least once, preferably more than once, and the more preferred method comprises the filtration step for separating a polymer and a washing solution between washings.

In one embodiment of the present invention, a washing additive may be used during washing, and examples of such washing additives include acids, alkali metal salts, or alkaline earth metal salts. When acids are used, PAS is immersed in an aqueous solution acidified by adding, e.g., an organic acid or an inorganic acid to the above-described water, and it is preferred that the pH of the aqueous solution after heated and washed be 2 to 8. Examples of organic acids and inorganic acids include, but are not limited to, acetic acid, propionic acid, hydrochloric acid, sulfuric acid, phosphoric acid, and formic acid, among which acetic acid and hydrochloric acid are preferred. When an alkali metal salt or an alkaline earth metal salt is used as a washing additive, the method in which PAS is immersed in an aqueous solution obtained by adding an alkali metal salt or an alkaline earth metal salt to the above-described water can be exemplified, and the amount of such an alkali metal salt or an alkaline earth metal salt is preferably 0.01 to 5% by weight, more preferably 0.1 to 0.7% by weight, based on the PAS. Examples of alkali metal salts and alkaline earth metal salts include calcium salts, potassium salts, sodium salts, and magnesium salts of the organic acids or inorganic acids described above, but are not limited thereto.

Although any washing additive may be used as long as a PAS having an excellent melt flowability can be obtained, treating with an acid can be exemplified as a preferred method because it provides a higher melt flowability and besides it develops characteristics in that the ash content when the PAS obtained is ashed at 550° C. is so low that the PAS delivers excellent performance in applications requiring electrical insulating properties. From the standpoint of electrical insulating properties, the ash content is preferably not more than 0.5% by weight, more preferably not more than 0.3% by weight.

Although a washing additive may be used at any point during the washing step, for carrying out the washing efficiently with a small amount of an additive, the method in which the solid recovered by the flash method is washed with water for several times, after which the PAS is impregnated with an aqueous solution with the washing additive added and then treated at 150° C. or higher is preferred.

With respect to the ratio of PAS to a washing solution in the washing, the amount of a washing solution is preferably larger, and generally the bath ratio of 10 to 500 g to 1 liter of a washing solution is preferably selected, more preferably 50 to 200 g of PAS.

The PAS thus obtained is dried under atmospheric pressure and/or under reduced pressure. The drying temperature is preferably in the range of 120 to 280° C., more preferably in the range of 140 to 250° C. Although the drying atmosphere may be any of inert atmospheres such as nitrogen, helium, and reduced pressure; oxidizing atmospheres such as oxygen and air; and a mixed atmosphere of air and nitrogen, inert atmospheres are preferred in terms of melt viscosity. The drying time is preferably 0.5 to 50 hours, preferably 1 to 30 hours, and more preferably 1 to 20 hours.

(10) Produced PAS

The present invention can provide a PAS having a volatile component content of not more than 1.0% by weight when melted by heat under vacuum at 320° C. for 2 hours, a melt viscosity (measured at a temperature of 300° C. and a shear rate of 1216 sec$^{-1}$) of 2 Pa·s to less than 100 Pa·s, and a peak temperature of crystallization of 248° C. or higher detected using differential scanning calorimetry when the temperature is raised to 340° C. and lowered at a rate of 20° C./min after holding for 1 minute. Satisfying all of these means that a PAS combining a low volatile component content, high melt flowability, and a high melt crystallization temperature can be obtained. The PAS can significantly improve stains of a metal mold and vent clogging of a metal mold which lead to reduced production efficiency and also can be applied to complicated-shaped injection-molded articles requiring high melt flowability. Further, the high melt crystallization temperature allows a shortened molding cycle, whereby the high productivity which cannot be achieved by the conventional PAS can be attained. For complicated-shaped injection-molded articles, a PAS having high melt flowability is preferred, and the melt viscosity needs to be 2 Pa·s or more because the strength of the molded article tends to be reduced when less than 2 Pa·s.

The volatile component content of the PAS obtained is preferably 0.1 to 0.9% by weight, and the melt viscosity is preferably from 2 Pa·s to less than 60 Pa·s, more preferably from 2 Pa·s to less than 20 Pa·s, and further preferably from 2 Pa·s to less than 10 Pa·s. The peak temperature of crystallization is preferably from 248° C. to 260° C., more preferably from 248° C. to less than 255° C.

The volatile component content described above means the amount of the adhesive component liquefied or solidified by cooling the component which volatilizes when a PAS is melted by heat under vacuum, and measured by heating a glass ampule in which a PAS is vacuum-sealed in a tubular furnace. For the shape of the glass ampule, the body portion is 100 mm×25 mm; the neck portion is 255 mm×12 mm; and the wall thickness is 1 mm. In a specific measurement method, only the body portion of a glass ampule in which a PAS is vacuum-sealed is inserted into a tubular furnace at 320° C. and heated for 2 hours, whereby volatile gas is cooled and adheres at the neck portion of the ampule, which is not heated by the tubular furnace; the neck portion is cut out and weighed, and then the adhering volatile component is dissolved in chloroform for removal; and then the neck portion is dried and weighed again. The volatile component content is determined from the difference between the weights of the neck portion of the ampule before and after the removal of the volatile component, and calculated as a percentage relative to the weight of the PAS used for the measurement.

The melt viscosity described above means a melt viscosity detected when the PAS melted at a certain temperature is subjected to a certain shear rate, and more particularly a melt viscosity detected, using a capillary rheometer equipped with a die having a pore length of 10.00 mm and a pore diameter of 0.50 mm, when a measurement is made at a shear rate of 1216 sec$^{-1}$ after the PAS is introduced into a cylinder set at 300° C. and held for 5 minutes.

Further, the peak temperature of crystallization described above is what is commonly called a melt crystallization temperature, and more particularly the peak temperature of crystallization which appears at (4) below:

Using differential scanning calorimetry, under a nitrogen atmosphere, and at a rate of rising and falling temperature of 20° C./min, (1) raise the temperature from 50° C. to 340° C., and hold for 1 minute at 340° C.; (2) lower the temperature to 100° C.; (3) raise the temperature to 340° C. again, and hold for 1 minute at 340° C.; and (4) lower the temperature to 100° C. again.

By recovering the PAS using the flash method after the polymerization is carried out in a temperature range of the present invention, the PAS having a chloroform extracted volume of not less than 1.0% by weight can be obtained.

Preferred is not less than 2.0% by weight. Such a chloroform extracted volume is calculated as follows: Soxhlet extraction is performed with chloroform at 90° C. for 3 hours, and the weight of the component obtained when the chloroform is distilled away from the extract is calculated as a percentage of relative to the polymer weight. More than 1.0% by weight of the chloroform extracted volume of the PAS indicates that a large amount of oligomer components are contained in the PAS, which is a preferred embodiment for ensuring high melt flowability. The upper limit of the chloroform extracted volume is preferably 10% by weight, more preferably 5% by weight.

The PAS obtained tends to have smaller nitrogen content. Generally, the PAS obtained by reacting a sulfidizing agent with a dihalogenated aromatic compound in an organic polar solvent in the presence of an alkali metal hydroxide contains nitrogen. This is because an alkali metal alkylaminoalkylcarboxylate produced by reacting the organic polar solvent such as NMP with the alkali metal hydroxide reacts with a terminal of the PAS as a side reaction during polymerization to form a terminal having a nitrogen atom. However, in an aspect of the present invention, the side reactions can be prevented by carrying out the polymerization under certain polymerization conditions, and accordingly the nitrogen content tends to be reduced. However, significantly low nitrogen content causes a problem in that the reactivity with various coupling agents, which are often used during melt extrusion to enhance the toughness and strength of the PAS, is reduced. The nitrogen content of the PAS therefor is preferably from 500 ppm to 1200 ppm, more preferably from 600 ppm to 1100 ppm.

(11) Other Post-Treatments

The PAS can also be treated under an oxygen-containing atmosphere at a temperature of 130 to 260° C. to remove the volatile component or to be cross-linked for a higher molecular weight.

In the case where dry heat treatment is carried out for the purpose of removing volatile matter while inhibiting cross-linking for a higher molecular weight, the temperature is preferably 130 to 250° C., more preferably in the range of 160 to 250° C. Desirably, oxygen concentration is less than 2% by volume, and further less than 1% by volume. Drying under reduced pressure is also one of the preferred methods. Treatment time is preferably 0.5 to 50 hours, more preferably 1 to 20 hours, and further preferably 1 to 10 hours.

In the case where dry heat treatment is carried out for the purpose of cross-linking for a higher molecular weight, the temperature is preferably 160 to 260° C., more preferably in the range of 170 to 250° C. Desirably, oxygen concentration is not less than 2% by volume, and further not less than 8% by volume. Treatment time is preferably 1 to 100 hours, more preferably 2 to 50 hours, and further preferably 3 to 25 hours.

Although the apparatus for the heat treatment may be an ordinary hot-air dryer or a rotary heater or a heater equipped with a stirring blade, for an efficient and more uniform treatment, it is more preferable to use a rotary heater or a heater equipped with a stirring blade.

In applying the PAS to a wide variety of applications described below, design is an important factor. To provide excellent design, the degree of whiteness of the PAS is preferably high, and L value, which represents the degree of whiteness, is preferably 80 or more, more preferably 83 or more. Generally, in cases where heat treatment is carried out in the post-treatment of the PAS, the PAS tends to be colored by the thermal history or oxidation crosslinking, and therefore, when the post-treatment is carried out, it is preferably carried out in the range within which such a degree of whiteness can be maintained.

(12) Applications

The PAS has excellent heat resistance, chemical resistance, flame resistance, electrical properties, and mechanical properties, and applied for injection molding, injection compression molding, and blow molding applications. In addition, the PAS can be molded into an extrusion-molded article such as a sheet, a film, a fiber, and a pipe by extrusion molding, but it is suitably applied particularly for injection molding applications. Examples of the injection molding applications include electrical and electronic parts typified by, for example, sensors, LED lamps, connectors, sockets, resistors, relay cases, switches, coil bobbins, capacitors, variable capacitor cases, optical pickups, oscillators, various terminal boards, transformers, plugs, printed boards, tuners, speakers, microphones, headphones, small motors, magnetic head bases, power modules, semiconductors, liquid crystals, FDD carriages, FDD chassis, motor brush holders, parabolic antennas, and computer-related parts; household and office electric appliance parts typified by, for example, VTR parts, TV parts, irons, hair dryers, rice cooker parts, microwave oven parts, acoustic parts, voice apparatus parts such as audio compact discs, illumination parts, refrigerator parts, air conditioner parts, typewriter parts, and word processor parts; machine-related parts typified by, for example, office computer-related parts, telephone set-related parts, facsimile-related parts, copier-related parts, washing jigs, motor parts, lighters, and typewriters: optical apparatus- and precision machine-related parts typified by, for example, microscopes, binoculars, cameras, and timepieces; water-related parts such as water tap parts, mixing faucets, pump parts, pipe joints, water quantity control valves, relief valves, water temperature sensors, water quantity sensors, and water meter housings; motor vehicle-related parts such as valve alternator terminals, alternator connectors, IC regulators, potentiometer bases for light dimmer, various valves such as exhaust gas valves, various pipes such as fuel-related pipes, exhaust system pipe, and induction system pipes, air intake nozzle snorkels, intake manifolds, fuel pumps, engine cooling water joints, carburetor main bodies, carburetor spacers, exhaust gas sensors, cooling water sensors, oil temperature sensors, throttle position sensors, crankshaft position sensors, air flow meters, brake pad wear sensors, thermostat bases for air conditioners, warming hot air flow control valves, brush holders for radiator motors, water pump impellers, turbine vanes, wiper motor-related parts, distributors, starter switches, starter relays, wire harnesses for transmissions, window washer nozzles, air conditioner panel switch boards, coils for fuel-related electromagnetic valves, connectors for fuses, horn terminals, electric equipment part insulating plates, step motor rotors, lamp sockets, lamp reflectors, lamp housings, brake pistons, solenoid bobbins, engine oil filters, igniter cases, speed sensors, cable liners, engine control unit cases, engine driver unit cases, capacitor cases, motor insulating materials, cases for control system parts of hybrid cars; and other various applications.

Examples of employable methods for producing a PPS film using the PAS obtained by the present invention include known melt film-forming methods such as, for example, a method in which a PAS is melted in a monoaxial or biaxial extruder, extruded through a film die, and cooled on a cooling drum to form a film, or a biaxial stretching method in which the film thus formed is stretched longitudinally and latitudinally using a roller longitudinal stretching apparatus and a latitudinal stretching apparatus called a tenter, but are not limited thereto.

The PAS film thus obtained have excellent mechanical properties, electrical properties, and heat resistance, and can be suitably used in various applications such as dielectric films in film capacitors or chip capacitors and release films.

Examples of applicable method for producing PAS fibers using the PAS obtained by the present invention include known melt spinning methods such as, for example, a method in which PAS chips as a raw material are kneaded as they are fed into a monoaxial or biaxial extruder, extruded from a spinneret through, e.g., a polymer streamline shunt provided at the tip of the extruder and a filter layer, cooled, stretched, and heat-set, but are not limited thereto.

The PAS monofilaments or short fibers thus obtained can be suitably used in various applications such as dryer canvases for papermaking, net conveyors, and bag filters.

EXAMPLES

The method of the present invention will now be described more particularly by way of Examples and Comparative Examples, but the present invention is not limited to only these Examples. The measurement methods are as follows.

[Melt Viscosity]

Capilo Graph 1C manufactured by Toyo Seiki Co., Ltd. was used, and a die having a pore length of 10.00 mm and a pore diameter of 0.50 mm was used. About 20 g of sample was introduced into a cylinder set at 300° C., and the melt viscosity was measured at a shear rate of 1216 sec$^{-1}$ after holding for 5 minutes.

[Volatile Component Content]

Into a glass ampule having a body portion of 100 mm×25 mm, a neck portion of 255 mm×12 mm, and a wall thickness of 1 mm, 3 g of sample was weighed, and then the ampule was vacuum-sealed. Only the body portion of the glass ampule was inserted into a ceramic electric tube furnace ARF-30K manufactured by Asahirika Seisakusho Co., Ltd., and heated at 320° C. for 2 hours. The ampule was taken out, and then the neck portion of the ampule, which was not heated by the tubular furnace and to which volatile gas adhered, was cut out with a file and weighed. Thereafter, the adhered gas was removed by dissolution with 5 g of chloroform, and then the neck portion was dried using a glass dryer at 60° C. for 1 hour and weighed again. The difference between the weights of the neck portion of the ampule before and after the removal of the gas was calculated, and the ratio thereof to the amount of the sample charged was defined as volatile component content (% by weight).

[Melt Crystallization Temperature]

Using DSC7 manufactured by PerkinElmer, Inc., with about 5 mg of sample, under a nitrogen atmosphere, and at a rate of rising and falling temperature of 20° C./min:
(1) Raise the temperature from 50° C. to 340° C., and hold for 1 minute at 340° C.,
(2) Lower the temperature to 100° C.,
(3) Raise the temperature to 340° C. again, and hold for 1 minute at 340° C., and
(4) Lower the temperature to 100° C. again.
The peak temperature of crystallization which appears at (4) was defined as melt crystallization temperature (Tmc).

[Ash Content]

Into a crucible preheated at 550° C., 5 g of sample was accurately weighed, and placed in an electric furnace at 550° C. for 24 hours to be ashed. The ash amount remained in the crucible was accurately weighed, and the ratio thereof to the sample amount before ashing was defined as ash content (% by weight).

[Nitrogen Content]

Using a horizontal reactor, the sample was pyrolyzed and oxidized at a final temperature of 900° C., and the nitrogen monoxide produced was supplied to a nitrogen detector ND-100 manufactured by Mitsubishi Chemical Analytech Co., Ltd. to measure the nitrogen content in the polymer.

[Chloroform Extracted Weight]

Five grams of polymer was subjected to Soxhlet extraction with 100 g of chloroform at 90° C. for 3 hours, and the weight of the component obtained when the chloroform was distilled away from the extract was calculated as a percentage relative to the polymer weight, which percentage was defined as chloroform extracted weight (% by weight).

Example 1

A 70-liter autoclave equipped with a stirrer and a bottom stop valve was charged with 8.26 kg (70.00 mol) of 47.5% sodium hydrosulfide, 2.94 kg (70.63 mol) of 96% sodium hydroxide, 11.45 kg (115.50 mol) of N-methyl-2-pyrrolidone (NMP), and 5.50 kg of ion exchanged water, and gradually heated to 225° C. at atmospheric pressure under nitrogen over about 3 hours. When 9.82 kg of water and 0.28 kg of NMP were distilled, the heating was terminated to start cooling. At this point, the amount of water remained in the system per mol of an alkali metal hydrosulfide charged was 1.01 mol including the water consumed by hydrolysis of NMP. The amount of scattered hydrogen sulfide was 1.4 mol, and accordingly the sulfidizing agent in the system after the dehydration step was 68.6 mol. With the scattering of hydrogen sulfide, an additional 1.4 mol of sodium hydroxide was produced in the system.

Thereafter, the autoclave was cooled to 200° C., and the reaction vessel was hermetically sealed under nitrogen gas after the addition of 10.19 kg (69.29 mol) of p-dichlorobenzene (p-DCB) and 9.37 kg (94.50 mol) of NMP, after which Step 1 and Step 2 were carried out under the reaction conditions below while stirring at 240 rpm.

<Step 1> The temperature was raised from 200° C. to 230° C. at 0.8° C./min over 38 minutes, and continuously the temperature was raised from 230° C. to 238° C. at 0.6° C./min over 13 minutes. After the reaction was carried out at a constant temperature of 238° C. for 108 minutes, the temperature was raised from 238° C. to 245° C. at 0.8° C./min over 9 minutes. For the polymerization time in Step 1, (T1) was 168 minutes, and (T1a) 130 minutes. The reactant was sampled at the end of Step 1, and the amount of p-DCB remained in the sample was quantitatively determined by gas chromatograph. From the results, the consumption rate, that is, the conversion ratio of p-DCB was calculated to be 93%.

<Step 2> Following Step 1, the temperature was raised from 245° C. to 255° C. at 0.8° C./min over 12 minutes. The polymerization time in Step 2 (T2) was 12 minutes.

Immediately after Step 2 was completed, the bottom stop valve of the autoclave was opened. The contents were flashed into an apparatus equipped with a stirrer, and dried in the apparatus equipped with a stirrer at 230° C. for 1.5 hours until 95% or more of NMP used in the polymerization was removed by volatilization to recover a solid containing PPS and salts.

The recovery obtained and 74 liters of ion exchanged water were charged into an autoclave equipped with a stirrer. The mixture was washed at 75° C. for 15 minutes and then filtered through a filter to obtain a cake. The operation of washing the obtained cake with ion exchanged water at 75° C. for 15 minutes and filtering it was performed three times, and then the cake, 74 liters of ion exchanged water, and 0.4 kg of acetic acid were charged into the autoclave equipped with a stirrer. The atmosphere in the autoclave was replaced with nitrogen, and then the temperature was raised to 195° C. Thereafter, the autoclave was cooled, and the contents were taken out. The contents were filtered through a filter to obtain a cake. The cake obtained was dried at 120° C. under a nitrogen stream to obtain a dried PPS.

Example 2

The same operation as in Example 1 was repeated except that the reaction was carried out at a constant temperature of 238° C. in Step 1 for 128 minutes. T1 was 188 minutes, and T1a was 150 minutes. The conversion ratio of p-DCB was 94.5%.

Example 3

The same operation as in Example 1 was repeated except that Step 1 and Step 2 were carried out under the reaction conditions below.
<Step 1> The temperature was raised from 200° C. to 230° C. at 0.8° C./min over 38 minutes, and continuously the temperature was raised from 230° C. to 238° C. at 0.6° C./min over 13 minutes. After the reaction was carried out at a constant temperature of 238° C. for 83 minutes, the temperature was raised from 238° C. to 245° C. at 0.8° C./min over 9 minutes. T1 was 143 minutes, and T1a was 105 minutes. The conversion ratio of p-DCB was 90%.
<Step 2> Following Step 1, the temperature was raised from 245° C. to 255° C. at 0.8° C./min over 12 minutes, and then the reaction was carried out at a constant temperature of 255° C. for 25 minutes. T2 was 37 minutes.

Example 4

The same operation as in Example 1 was repeated except that Step 1 and Step 2 were carried out under the reaction conditions below.
<Step 1> The temperature was raised from 200° C. to 230° C. at 0.8° C./min over 38 minutes, and continuously the temperature was raised from 230° C. to 238° C. at 0.6° C./min over 13 minutes. After the reaction was carried out at a constant temperature of 238° C. for 89 minutes, the temperature was raised from 238° C. to 245° C. at 0.8° C./min over 9 minutes. T1 was 149 minutes, and T1a was 111 minutes. The conversion ratio of p-DCB was 91%.
<Step 2> Following Step 1, the temperature was raised from 245° C. to 270° C. at 0.8° C./min 31 minutes. T2 was 31 minutes.

Example 5

The same operation as in Example 2 was repeated except that 2.80 kg (67.20 mol) of 96% sodium hydroxide was used. The conversion ratio of p-DCB at the end of Step 1 was 94.5%.

Example 6

The same operation as in Example 1 was repeated except that the autoclave was cooled to 200° C. after completion of the dehydration step and that the amount of NMP introduced together with p-DCB was 12.84 kg (129.50 mol). The conversion ratio of p-DCB at the end of Step 1 was 94%.

Example 7

A 70-liter autoclave equipped with a stirrer and a bottom stop valve was charged with 8.26 kg (70.00 mol) of 47.5% sodium hydrosulfide, 2.94 kg (70.63 mol) of 96% sodium hydroxide, 11.45 kg (115.50 mol) of N-methyl-2-pyrrolidone (NMP), 0.29 kg (3.5 mol) of sodium acetate, and 5.50 kg of ion exchanged water, and gradually heated to 225° C. at atmospheric pressure under nitrogen over about 3 hours. When 9.82 kg of water and 0.28 kg of NMP were distilled, the heating was terminated to start cooling. At this point, the amount of water remained in the system per mol of an alkali metal hydrosulfide charged was 1.01 mol including the water consumed by hydrolysis of NMP. The amount of scattered hydrogen sulfide was 1.4 mol, and accordingly the sulfidizing agent in the system after the dehydration step was 68.6 mol. With the scattering of hydrogen sulfide, an additional 1.4 mol of sodium hydroxide was produced in the system.

Polymerization, flashing, washing, and drying after the dehydration step were carried out in the same manner as in Example 2. The reaction rate of p-DCB at the end of Step 1 was 94%.

Example 8

The same operation as in Example 1 was repeated except that the autoclave was cooled to 200° C. after completion of the dehydration step and that the amount of p-DCB introduced together with NMP was 10.49 kg (71.34 mol). The conversion ratio of p-DCB at the end of Step 1 was 93.5%.

Comparative Example 1

A 70-liter autoclave equipped with a stirrer and a bottom stop valve was charged with 8.26 kg (70.00 mol) of 47.5% sodium hydrosulfide, 2.94 kg (70.63 mol) of 96% sodium hydroxide, 11.45 kg (115.50 mol) of N-methyl-2-pyrrolidone (NMP), and 5.50 kg of ion exchanged water, and gradually heated to 225° C. at atmospheric pressure under nitrogen over about 3 hours. When 9.82 kg of water and 0.28 kg of NMP were distilled, the heating was terminated to start cooling. At this point, the amount of water remained in the system per mol of an alkali metal hydrosulfide charged was 1.01 mol including the water consumed by hydrolysis of NMP. The amount of scattered hydrogen sulfide was 1.4 mol, and accordingly the sulfidizing agent in the system after the dehydration step was 68.6 mol. With the scattering of hydrogen sulfide, an additional 1.4 mol of sodium hydroxide was produced in the system.

Thereafter, the autoclave was cooled to 200° C., and the reaction vessel was hermetically sealed under nitrogen gas after the addition of 10.39 kg (70.66 mol) of p-dichlorobenzene (p-DCB) and 9.37 kg (94.50 mol) of NMP, after which Step 1 and Step 2 were carried out under the reaction conditions below while stirring at 240 rpm.
<Step 1> The temperature was raised from 200° C. to 230° C. at 0.8° C./min over 38 minutes, and continuously the temperature was raised from 230° C. to 245° C. at 0.6° C./min over 25 minutes. T1 was 63 minutes, and T1a was 25 minutes. The conversion ratio of p-DCB was 65%.
<Step 2> Following Step 1, the temperature was raised from 245° C. to 276° C. at 0.6° C./min over 52 minutes, and then the reaction was carried out at a constant temperature of 276° C. for 65 minutes. T2 was 117 minutes.

Flashing, washing, and drying after completion of Step 2 were carried out in the same manner as in Example 1.

Comparative Example 2

The same operation as in Example 1 was repeated except that Step 1 was carried out under the reaction conditions below and that the flashing operation was performed without carrying out Step 2 after completion of Step 1. Following the flashing, drying was carried out in the apparatus equipped with a stirrer at 230° C. for 3 hours until 95% or more of NMP used in the polymerization was removed by volatilization to recover a solid containing PPS and salts.
<Step 1> The temperature was raised from 200° C. to 230° C. at 0.8° C./min over 38 minutes, and continuously the temperature was raised from 230° C. to 238° C. at 0.6° C./min over 13 minutes. The reaction was carried out at a constant temperature of 238° C. for 129 minutes. T1 was 180 minutes, and T1a was 142 minutes. The conversion ratio of p-DCB was 93.5%.

Comparative Example 3

The same operation as in Example 1 was repeated except that Step 1 and Step 2 were carried out under the reaction conditions below.
<Step 1> The temperature was raised from 200° C. to 220° C. at 0.8° C./min over 25 minutes. The reaction was carried out at a constant temperature of 220° C. for 131 minutes, and then the temperature was raised from 220° C. to 245° C. at 0.8° C./min over 31 minutes. T1 was 168 minutes, and T1a was 19 minutes. The conversion ratio of p-DCB was 88.5%.
<Step 2> Following Step 1, the temperature was raised from 245° C. to 255° C. at 0.8° C./min over 12 minutes. T2 was 12 minutes.

Comparative Example 4

A 70-liter autoclave equipped with a stirrer and a bottom stop valve was charged with 8.26 kg (70.00 mol) of 47.5% sodium hydrosulfide, 2.94 kg (70.63 mol) of 96% sodium hydroxide, 11.45 kg (115.50 mol) of N-methyl-2-pyrrolidone (NMP), 1.89 kg (23.1 mol) of sodium acetate, and 5.50 kg of ion exchanged water, and gradually heated to 225° C. at atmospheric pressure under nitrogen over about 3 hours. When 9.82 kg of water and 0.28 kg of NMP were distilled, the heating was terminated to start cooling. At this point, the amount of water remained in the system per mol of an alkali metal hydrosulfide charged was 1.01 mol including the water consumed by hydrolysis of NMP. The amount of scattered hydrogen sulfide was 1.4 mol, and accordingly the sulfidizing agent in the system after the dehydration step was 68.6 mol. With the scattering of hydrogen sulfide, an additional 1.4 mol of sodium hydroxide was produced in the system.

Thereafter, the autoclave was cooled to 200° C., and the reaction vessel was hermetically sealed under nitrogen gas after the addition of 10.19 kg (69.29 mol) of p-dichlorobenzene (p-DCB) and 9.37 kg (94.50 mol) of NMP, after which Step 1 and Step 2 were carried out under the reaction conditions below while stirring at 240 rpm.
<Step 1> The temperature was raised from 200° C. to 230° C. at 0.8° C./min over 38 minutes, and continuously the temperature was raised from 230° C. to 238° C. at 0.6° C./min over 13 minutes. After the reaction was carried out at a constant temperature of 238° C. for 83 minutes, the temperature was raised from 238° C. to 245° C. at over 9 minutes. T1 was 143 minutes, and T1a was 105 minutes. The conversion ratio of p-DCB was 88%.
<Step 2> Following Step 1, the temperature was raised from 245° C. to 255° C. at 0.8° C./min over 12 minutes, and then the reaction was carried out at a constant temperature of 255° C. for 165 minutes. T2 was 177 minutes.

Washing and drying after completion of Step 2 were carried out in the same manner as in Example 1.

Comparative Example 5

The same operation as in Example 1 was repeated except that Step 2 was carried out under the reaction conditions below.
<Step 2> Following Step 1, the temperature was raised from 245° C. to 255° C. at 0.8° C./min over 12 minutes, and then the reaction was carried out at a constant temperature of 260° C. for 60 minutes. T2 was 72 minutes.

The melt viscosity, the volatile component content, and the melt crystallization temperature (Tmc) of the PAS obtained, and other measurement results are shown in Table 1. As can be seen from Examples 1 to 8, by carrying out the reaction under certain conditions in Step 1 and Step 2, a PAS combining high melt flowability, a low volatile component content, and a high melt crystallization temperature can be obtained.

TABLE 1

|  |  | Example 1 | Example 2 | Example 3 | Example 4 | Example 5 | Example 6 | Example 7 | Example 8 |
|---|---|---|---|---|---|---|---|---|---|
| p-DCB/Sulfidizing agent | mol/1 mol | 1.01 | 1.01 | 1.01 | 1.01 | 1.01 | 1.01 | 1.01 | 1.04 |
| NaOH/Sulfidizing agent | mol/1 mol | 1.05 | 1.05 | 1.05 | 1.05 | 1.00 | 1.05 | 1.05 | 1.05 |
| NMP used for polymerization solvent/Sulfidizing agent | mol/1 mol | 3.02 | 3.02 | 3.02 | 3.02 | 3.02 | 3.53 | 3.02 | 3.02 |
| Sodium acetate/Sulfidizing agent | mol/1 mol | 0 | 0 | 0 | 0 | 0 | 0 | 0.05 | 0 |
| Step 1 Polymerization time of 200° C. to less than 245° C. (T1) | min | 168 | 188 | 143 | 149 | 188 | 168 | 188 | 168 |
| Polymerization time of 230° C. to less than 245° C. (T1a) | min | 130 | 150 | 105 | 111 | 150 | 130 | 150 | 130 |
| Step 2 Polymerization time of 245° C. to less than 280° C. (T2) | min | 12 | 12 | 37 | 31 | 12 | 12 | 12 | 12 |
| T1/T2 |  | 14.0 | 15.7 | 3.9 | 4.8 | 15.7 | 14.0 | 15.7 | 14.0 |
| T1a/T2 |  | 10.8 | 12.5 | 2.8 | 3.6 | 12.5 | 10.8 | 12.5 | 10.8 |
| T1 + T2 | min | 180 | 200 | 180 | 180 | 200 | 180 | 200 | 180 |
| Melt viscosity (Temperature 300° C., Shear rate 1216 sec$^{-1}$) | Pa·s | 2.3 | 3.0 | 3.7 | 3.6 | 9.2 | 8.5 | 2.8 | 2.3 |
| Volatile component content | wt % | 0.76 | 0.77 | 0.89 | 0.79 | 0.74 | 0.54 | 0.51 | 0.8 |
| Tmc | ° C. | 250.3 | 250.4 | 251.9 | 251.6 | 250.1 | 248.5 | 250.7 | 250.9 |
| Ash content | wt % | 0.05 | 0.05 | 0.05 | 0.05 | 0.05 | 0.05 | 0.04 | 0.05 |
| Chloroform extracted weight | wt % | 2.5 | 3.0 | 2.6 | 2.8 | 2.6 | 3.5 | 2.4 | 2.8 |
| Nitrogen content | ppm | 1070 | 1060 | 1020 | 1070 | 910 | 820 | 1050 | 1070 |

TABLE 1-continued

|  |  |  | Comparative Example 1 | Comparative Example 2 | Comparative Example 3 | Comparative Example 4 | Comparative Example 5 |
|---|---|---|---|---|---|---|---|
| p-DCB/Sulfidizing agent | | mol/1 mol | 1.03 | 1.01 | 1.01 | 1.01 | 1.01 |
| NaOH/Sulfidizing agent | | mol/1 mol | 1.05 | 1.05 | 1.05 | 1.05 | 1.05 |
| NMP used for polymerization solvent/Sulfidizing agent | | mol/1 mol | 3.02 | 3.02 | 3.02 | 3.02 | 3.02 |
| Sodium acetate/Sulfidizing agent | | mol/1 mol | 0 | 0 | 0 | 0.33 | 0 |
| Step 1 | Polymerization time of 200° C. to less than 245° C. (T1) | min | 63 | 180 | 168 | 143 | 168 |
|  | Polymerization time of 230° C. to less than 245° C. (T1a) | min | 25 | 142 | 19 | 105 | 130 |
| Step 2 | Polymerization time of 245° C. to less than 280° C. (T2) | min | 117 | 0 | 12 | 177 | 72 |
| T1/T2 | | | 0.5 | — | 14.0 | 0.8 | 2.3 |
| T1a/T2 | | | 0.2 | — | 1.6 | 0.6 | 1.8 |
| T1 + T2 | | min | 180 | 180 | 180 | 320 | 240 |
| Melt viscosity (Temperature 300° C., Shear rate 1216 sec$^{-1}$) | | Pa · s | 6.4 | 1.1 | 0.9 | 110 | 10.2 |
| Volatile component content | | wt % | 1.12 | 0.65 | 0.71 | 0.46 | 1.05 |
| Tmc | | ° C. | 241.9 | 247.8 | 246.1 | 237.9 | 249.8 |
| Ash content | | wt % | 0.05 | 0.05 | 0.05 | 0.01 | 0.05 |
| Chloroform extracted weight | | wt % | 4.4 | 4.0 | 4.0 | 1.8 | 3.8 |
| Nitrogen content | | ppm | 1230 | 1100 | 1100 | 920 | 1120 |

The invention claimed is:

1. A method for producing a polyarylene sulfide by reacting a sulfidizing agent with a dihalogenated aromatic compound in an organic polar solvent in the presence of an alkali metal hydroxide comprising:
   (Step 1) carrying out a reaction of reacting the sulfidizing agent with the dihalogenated aromatic compound in the organic polar solvent in the presence of the alkali metal hydroxide for a polymerization time (T1), wherein the polymerization time (T1) includes carrying out polymerization in a temperature range of 230° C. to less than 245° C. for a period of time (T1a) including a time of rising and falling temperature that is not less than 30 minutes and less than 3.5 hours and that a conversion ratio of the dihalogenated aromatic compound at the end of the step is 80 to 98 mol.% to produce a prepolymer of polyarylene sulfide, and
   (Step 2) carrying out the reaction in a temperature range of 245° C. to less than 280° C. for a polymerization time (T2) including a time of rising and falling temperature of 5 minutes to less than 1 hour to obtain the polyarylene sulfide;
   wherein the total reaction time from the start of Step 1 to the end of Step 2 (T1 +T2) is less than 5 hours.

2. The method for producing a polyarylene sulfide according to claim 1, wherein a ratio of the polymerization time of 230° C. to less than 245° C. in the Step 1 (T1a) to the polymerization time in the Step 2 (T2) (T1a/T2) is 0.5 or more.

3. The method for producing a polyarylene sulfide according to claim 1, wherein the polymerization time (T1) including a time of rising and falling temperature in a temperature range of 200° C. to less than 245° C., which includes Step 1, is not less than 1.5 hours and less than 4 hours.

4. The method for producing a polyarylene sulfide according to claim 3, wherein a ratio of the polymerization time of 200° C. to less than 245° C. (T1) to the polymerization time in the Step 2 (T2) (T1/T2) is 1.2 or more.

5. The method for producing a polyarylene sulfide according to claim 1, wherein the polyarylene sulfide is recovered by a flash method.

6. The method for producing a polyarylene sulfide according to claim 1, wherein the amount of the alkali metal hydroxide present in the reaction system at the start of the Step 1 is from 0.9 mol to less than 1.2 mol per mol of the sulfidizing agent.

7. The method for producing a polyarylene sulfide according to claim 1, wherein the amount of the organic polar solvent used in the reaction is from 2.5 mol to less than 5.5 mol per mol of the sulfidizing agent.

* * * * *